United States Patent
Ergen

(10) Patent No.: US 11,026,241 B2
(45) Date of Patent: Jun. 1, 2021

(54) METHOD AND SYSTEM FOR ASSIGNING ONE OR MORE OPTIMAL WIRELESS CHANNELS TO A WI-FI ACCESS POINT USING A CLOUD-BASED SOFTWARE DEFINED NETWORK (SDN)

(71) Applicant: Ambeent Wireless Bilişim ve Yazilim A.Ş, Istanbul (TR)

(72) Inventor: Mustafa Ergen, Istanbul (TR)

(73) Assignee: Ambeent Inc., Istanbul (TR)

(*) Notice: Subject to any disclaimer, the term of this patent is extended or adjusted under 35 U.S.C. 154(b) by 25 days.

(21) Appl. No.: 16/569,642

(22) Filed: Sep. 12, 2019

(65) Prior Publication Data

US 2020/0084777 A1 Mar. 12, 2020

Related U.S. Application Data

(60) Provisional application No. 62/765,749, filed on Sep. 12, 2018.

(51) Int. Cl.
| | |
|---|---|
| *H04W 72/08* | (2009.01) |
| *H04L 12/24* | (2006.01) |
| *G06N 20/00* | (2019.01) |
| *H04L 5/00* | (2006.01) |
| *H04W 24/02* | (2009.01) |

(52) U.S. Cl.
CPC .......... *H04W 72/085* (2013.01); *G06N 20/00* (2019.01); *H04L 5/0032* (2013.01); *H04L 41/16* (2013.01); *H04W 24/02* (2013.01); *H04W 72/082* (2013.01)

(58) Field of Classification Search
CPC ........ G06N 3/126; G06N 5/003; G06N 20/00; H04L 41/16; H04W 24/02; H04W 24/08; H04W 24/10; H04W 72/082; H04W 72/085

See application file for complete search history.

(56) References Cited

U.S. PATENT DOCUMENTS

2019/0215842 A1 * 7/2019 Silverman ............. H04W 24/10

OTHER PUBLICATIONS

Wah et al., Constrained Simulated Annealing with Applications in Nonlinear Continuous Constrained Global Optimization, Feb. 1999, pp. 1-8 (Year: 1999).*

* cited by examiner

*Primary Examiner* — Pao Sinkantarakorn
(74) *Attorney, Agent, or Firm* — Farrell Patent Law PC

(57) ABSTRACT

The invention provides a method and system for assigning one or more optimal wireless channels to a Wi-Fi access point of a plurality of Wi-Fi access points using a cloud-based orchestrator through a software defined network (SDN). To start with, RF measurements are collected from a plurality of client devices in the cloud using a RF measurement module. The RF measurements include received signal strength indicator (RSSI) measured by the plurality of client devices and a transmission channel from connected or nearby Wi-Fi access points. The one or more optimal wireless channels for the Wi-Fi access point are then derived by solving a complex optimization problem. This process employs an artificial intelligence (AI) module integrated with a global continuous optimization algorithm. The AI module utilizes the collected RF measurements and a plurality of measured variables for determining the one or more optimal wireless channels for the Wi-Fi access point using the optimization formulation.

15 Claims, 5 Drawing Sheets

US 11,026,241 B2

METHOD AND SYSTEM FOR ASSIGNING ONE OR MORE OPTIMAL WIRELESS CHANNELS TO A WI-FI ACCESS POINT USING A CLOUD-BASED SOFTWARE DEFINED NETWORK (SDN)

CROSS-REFERENCE TO RELATED APPLICATION

This application is based upon and claims priority to U.S. provisional patent application Ser. No. 62/765,749, entitled, "A Machine Learning Integrated Relaxation Based Channel Assignment Algorithm", filed on Sep. 12, 2018. The entire contents of the provisional application is incorporated herein by reference.

FIELD OF THE INVENTION

The invention generally relates to assigning one or more optimal wireless channels to a Wi-Fi access point of a plurality of Wi-Fi access points using a cloud platform. More specifically, the invention relates to deriving one or more optimal wireless channels for the Wi-Fi access point using an integration of artificial intelligence (AI)/machine learning and global continuous optimization approaches.

BACKGROUND OF THE INVENTION

Generally, Wi-Fi networks are formed using one or more Wi-Fi access points that support a connection of multiple wireless devices to a wired connection for access to the Internet. The size of Wi-Fi networks is increasing by densely deploying the Wi-Fi access points in places such as, but not limited to, residential spaces, apartments, office buildings and public spaces.

In dense deployments, the current Wi-Fi access points operate with low performance at high access point (AP) and station (STA) density due to the lack of self-organizing feature. Also, the current Wi-Fi access points include a channel scanning property, which scans the channels and performs a simplified channel assignment by considering received signal strength indicator (RSSI) that APs receive from nearby APs ($RSSI_{AP-AP}$) and the number of APs. If a new channel assignment is needed, the APs halt the transmission by taking the antenna into monitoring mode. The continuous repetition of halting the APs results in significant internet quality issues for STAs.

Further, a typical criterion in wireless communication is the signal quality which is the ratio of the primary signal power and the interfering signal powers on a same transmission channel. The signal quality of wireless communication is determined as signal to interference plus noise ratio (SINR), which is applicable to both STAs and APs. Since a STA becomes the transmitter when uploading data, the overall network quality is favored by increasing the SINRs for all individual network elements and for all transmission paths. Therefore, an RSSI matrix which includes $RSSI_{AP-AP}$, $RSSI_{AP-STA}$, $RSSI_{STA-AP}$, and $RSSI_{STA-STA}$ is considered for the most accurate decision making in selecting a transmission channel. Here, the $RSSI_{AP-AP}$ is the RSSI that APs receive from nearby APs, $RSSI_{AP-STA}$ is the RSSI that APs receive from nearby STAs, $RSSI_{STA-AP}$ is the RSSI that STAs receive from nearby APs, and $RSSI_{STA-STA}$ is the RSSI that STAs receive from nearby STAs. However, only a subset of RSSI matrix is measured in real time in a cost-effective manner and this in turn results in different approaches to Wi-Fi management.

An advantage of an existing approach to Wi-Fi management is that the APs perform better considering Clear Channel Assessment (CCA) which evaluates the maximum interference level to start the transmission. However, the existing approach does not guarantee that the data is transmitted to the STA since SINR is not included explicitly.

Further, there are various drawbacks for the large-scale implementation. Firstly, old APs do not have a scanning mode and transmit data on a predefined factory-set channel unless the users take a manual action to change the channel. Secondly, there is no centralized solution. Thirdly, the solution is totally vendor dependent, wherein the vendor modifies and updates all APs and constructs a cloud for the centralized computations. Combining the solution with other vendors is a challenging task and the integration is not cost-effective. Finally, even if the optimal channels are calculated in the cloud, there is no practical way to implement those on the APs.

While comparing $RSSI_{AP-STA}$ with $RSSI_{AP-AP}$, it is difficult to measure $RSSI_{AP-STA}$ and to upload parameters to the cloud in real-time. Since the STAs are highly mobile and the APs are to be scanned constantly, the APs cause interruption in transmission. However, there is no practical way to measure $RSSI_{STA-STA}$. In theory, any STA which uploads a data packet causes interference to nearby APs and STAs. However, most STAs are downloaders and the interference impact is ignored mostly.

Additionally, existing methods for channel assignment are implemented using an integer programming optimization algorithm, which maximizes the Wi-Fi link speed of network elements. However, the integer programming optimization algorithm suffers from computational complexity when the Wi-Fi network becomes large with multiple Wi-Fi access points.

Therefore, in light of the above, there is a need for a method and system for improving channel assignment performance over heuristic integer programming optimizations and maximizing the signal qualities within a Wi-Fi network in order to provide higher throughput despite different characteristics of network elements and changing network conditions.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
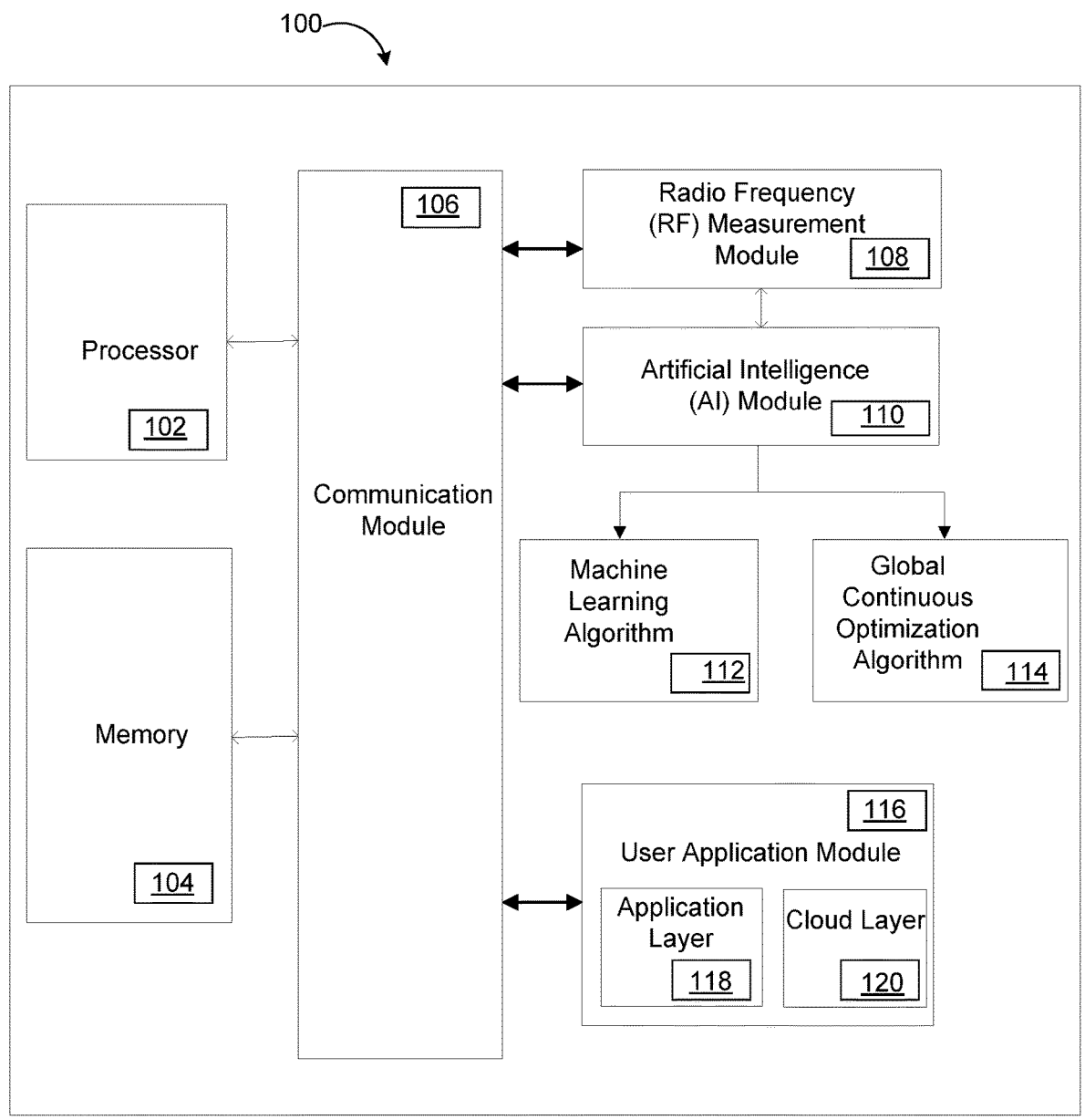
FIG. 1 illustrates a system for assigning one or more optimal wireless channels to a Wi-Fi access point of a plurality of Wi-Fi access points using a cloud-based software defined network (SDN) in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to deriving one or more optimal wireless channels for a Wi-Fi access point of a plurality of Wi-Fi access points using an integration of artificial intelligence (AI)/machine learning and global continuous optimization approaches.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for assigning one or more optimal wireless channels to a Wi-Fi access point of a plurality of Wi-Fi access points using a cloud-based software defined network (SDN). To start with, Radio Frequency (RF) measurements are collected from a plurality of client devices and a plurality of Wi-Fi access points or a single Wi-Fi access point in the cloud using an RF measurement module. The RF measurements may include, but need not be limited to, received signal strength indicator (RSSI) measured by the plurality of client devices and a transmission channel from connected or nearby Wi-Fi access points. The one or more optimal wireless channels for the Wi-Fi access point are then derived by solving a complex optimization problem. This process employs an artificial intelligence (AI) module integrated with a global continuous optimization algorithm. The AI module utilizes the collected RF measurements and a plurality of measured variables for determining the one or more optimal wireless channels for the Wi-Fi access point using the optimization formulation. The measured variables can be, but need not be limited to, RSSI at the Wi-Fi access point, RSSI at a client device of the plurality of client devices, a number of Wi-Fi access points whose signals reach the client device, and a number of Wi-Fi access points whose signals reach the Wi-Fi access point.

FIG. 1 illustrates a system 100 for assigning one or more optimal wireless channels to a Wi-Fi access point of a plurality of Wi-Fi access points using a cloud-based SDN in accordance with an embodiment of the invention.

As illustrated in FIG. 1, system 100 includes a processor 102 and a memory 104 communicatively coupled to processor 102. Processor 102 and memory 104 further communicate with various modules via a communication module 106. Communication module 106 may be configured to transmit data between modules, engines, databases, memories, and other components of system 100 for use in performing the functions discussed herein. Communication module 106 may include one or more communication types and utilize various communication methods for communication within system 100.

System 100 includes a Radio Frequency (RF) measurement module 108 to collect radio frequency measurements from a plurality of client devices located in the cloud. The RF measurements may include, but need not be limited to, received signal strength indicator (RSSI) measured by the plurality of client devices and a transmission channel from connected or nearby Wi-Fi access points (APs).

The plurality of client devices are user devices such as, but not limited to, a mobile device, a personal digital assistant, a computer, a laptop, a smart phone and a tablet. The connected or nearby Wi-Fi APs are deployed in places such as, but not limited to, homes, enterprises, and public spaces.

RF measurement module 108 in various devices, computers, and some other Wi-Fi devices scan RF environment constantly to report probable Wi-Fi APs for connection or offload cellular data to other Wi-Fi APs from externally installed applications. The scan procedure covers whole unlicensed spectrum which is divided into several channels based on country regulations. The more spectrum for the unlicensed band, the more potential for the high Wi-Fi link speed as signal interference is caused by the transmission on the same or adjacent channels primarily.

In accordance with an embodiment, RF measurement module 108 is installed as an application on any client device (STA). Currently, some devices provide the scanning functionality from externally installed applications whereas other devices are limited to rooted devices only, based on the operating system of the device.

In accordance with another embodiment, RF measurement module 108 is installed in Wi-Fi APs. The Wi-Fi APs determine the modulation for a data packet based on the RSSI from the STAs to which they are connected. Usually, the Wi-Fi APs do not deliver or stream the data packet to the cloud or any other software unless a specific software is installed on the Wi-Fi AP. Finally, with the addition of both hardware and software, some Wi-Fi APs scan their environment directly, thus eliminating the need of a STA for RF measurement.

Typically, RF measurement module 108 delivers the nearby Wi-Fi AP media access control (MAC), RSSI from the corresponding Wi-Fi AP, the transmission channel of the Wi-Fi AP at each scan and for each nearby Wi-Fi AP, including the connected Wi-Fi AP. Once the measurements from several STAs are stored in the cloud, which are evaluated and processed by an artificial intelligence (AI) module 110, the centralized decision making becomes feasible. The process of collecting RF measurements from the plurality of client devices in the cloud and evaluating/ processing the RF measurements is further described in detail in conjunction with FIG. 2.

Moving on, system 100 derives one or more optimal wireless channels for the Wi-Fi AP by solving a complex optimization problem by employing AI module 110 which runs a machine learning algorithm 112 and is further integrated with a global continuous optimization algorithm 114. AI module 110 utilizes the collected RF measurements and a plurality of measured variables to derive the one or more optimal wireless channels for the Wi-Fi AP using an optimization formulation. The plurality of measured variables may include, but need not be limited to, RSSI at the Wi-Fi AP, RSSI at a client device of the plurality of client devices, a number of Wi-Fi APs whose signals reach the client device, and a number of Wi-Fi APs whose signals reach the Wi-Fi AP.

AI module 110 included in the cloud utilizes measurements under different RF conditions to maximize the overall Wi-Fi performance, by solving the complex optimization problem with the measured variables. AI module 110 also considers the plurality of Wi-Fi APs, and nearby historical measurements to determine the channel update frequency and decision making in selecting the one or more optimal wireless channels.

Subsequently, AI module 110 delivers the optimal transmission channel for a Wi-Fi AP by maximizing the equation below:

$$SINR_{STA} = \frac{RSSI_i}{\sum_{j=1}^{N} C \cdot RSSI_j} \quad (1)$$

where, $RSSI_i$ is the received signal strength indicator from $i^{th}$ AP, $RSSI_j$ is the received signal strength indicator from $j^{th}$ AP, C is the interference coefficient as a function of transmission channels, $SINR_{STA}$ is the signal to interference plus noise ratio for a STA. A higher SINR results in a higher-level modulation which in turn provides a higher data rate delivery per time.

The maximization of Equation 1 delivers the optimal transmission channel for the Wi-Fi AP to maximize the data rate delivery to corresponding STA, without considering $RSSI_{AP-AP}$ explicitly. The cloud has the capability to estimate $RSSI_{AP-AP}$ from available measurements and obtain a superiority over channel assignment, and transforms the Equation 1 for one STA as follows:

$$\underset{CH}{\text{Max}} \quad \frac{RSSI_{i,STA}}{\sum_{j=1}^{N} C \cdot RSSI_{j,STA}} + \frac{RSSI_{i,AP}}{\sum_{j=1}^{M} C \cdot RSSI_{j,AP}} \quad (2)$$

$$CH \in 1, 2, \ldots, 11$$

where, $RSSI_{STA}$ and $RSSI_{AP}$ are the signal powers received by STA and Wi-Fi AP respectively, N is the number of Wi-Fi APs whose signal reaches to STA, M is the number of Wi-Fi APs whose signal reaches a particular Wi-Fi AP, and CH is the transmission channel of the Wi-Fi AP. Equation 2 provides the optimal transmission channel to maximize the data rate in both directions. The second term on the right-hand side of Equation 2 covers the impact of the Wi-Fi AP scanning and the Wi-Fi AP based channel assignment. Further, by maximization of Equation 2 both Wi-Fi AP and STA transmit data packets under minimum total interference.

A challenge with the optimization is the discrete nature of the channels which require the integer programming solutions. There are two methods to handle the optimization problem. A first approach is a brute force method, which evaluates the objective function in all combinations of channels since they are countable due to discrete nature. For instance, for 3 Wi-Fi APs in a country, 113 channel combinations are evaluated. However, the Wi-Fi AP density is increasing rapidly and the brute force method fails because the number of combinations are increased substantially with high Wi-Fi AP number ($11^{10}$ for 10 Wi-Fi APs). The second approach uses heuristic approaches which uses branch and cut algorithms which decrease the number of combinations significantly.

In theory, advanced integer programming techniques relax the integer variables and do some part of the calculations in the continuous domain. The nature of Equation 1 hinders the relaxation of discrete channels because of the interference/overlapping coefficient, C.

Further, AI module 110 utilizes machine learning algorithm 112 to evaluate the optimization formulation, used in solving the complex optimization problem, in all combinations of wireless channels to provide relaxation of discrete wireless channels considering an interference/overlapping coefficient, C.

The interference coefficient, C is an extent of how transmission from different Wi-Fi APs may cause interference based on their channels. Subsequently, AI module 110 is trained based on the interference coefficient values to relate the channels of the Wi-Fi APs to a corresponding coefficient for different combinations of Wi-Fi APs.

For instance, two Wi-Fi APs transmitting data on the same channel result in maximum interference. The extent of interference reduces and becomes zero at non-overlapping channels. For instance, the interference coefficient between channel 1 and channel 6 is zero. The Wi-Fi APs which include the associated channel can transmit data without harming another channel.

Further, the nature of C is a major problem for the relaxation of discrete channels. The relaxation results in decimal channels which does not correspond to a row or a column in C matrix. To convert the problem into the continuous domain, 121 (11×11) coefficient values are used in machine learning algorithm 112 to relate the Wi-Fi AP channels to the corresponding coefficient C. Subsequently, plurality of inputs and outputs provided to machine learning algorithm 112 are shown in the table below:

TABLE 1

| | Input | | Output |
|---|---|---|---|
| | $AP_1$ | $AP_2$ | C |
| Combintation$_1$ | 1 | 1 | $C_{1,1}$ |
| Combintation$_2$ | 1 | 2 | $C_{1,2}$ |
| ... | ... | ... | ... |
| Combintation$_{169}$ | 11 | 11 | $C_{11,11}$ |

Further, machine learning algorithm 112 utilizes a rectified linear unit (ReLU) activation function to provide an approximation of the actual values in addition to providing a smooth function for the continuous optimization. Subsequently, the optimization formulation is transformed to change the one or more optimal wireless channels based on measurements. The equation representing the transformation of the optimization formulation is as follows:

$$\text{Max}_{CH} \frac{RSSI_{i,STA}}{\sum_{j=1}^{N} AI(CH, CH_j) \cdot RSSI_{j,STA}} + \frac{RSSI_{i,AP}}{\sum_{j=1}^{M} AI(CH, CH_j) \cdot RSSI_{j,AP}} \quad (3)$$

$$CH \in [1,11]$$

where CH is the wireless channel of the Wi-Fi AP that is to be changed based on the measurements and AI is machine learning algorithm 112 obtained from training the data in Table 1. AI function can also deliver the interference coefficient for decimal channels. Further, the wireless channel is a continuous variable in Equation 3 and is implemented on the Wi-Fi AP by rounding the result of the optimization. Equation 3 is developed for one STA and Wi-Fi AP but can easily be extended to multi variable cases by simply adding the SINR values.

The problem in Equation 3 is solved through nonlinear programming algorithms. For the optimal wireless channel assignment, AI module 110 is integrated with global continuous optimization algorithm 114 which includes, one or more of a genetic algorithm, and simulated annealing algorithm. Global continuous optimization algorithm 114 is necessary for assigning one or more optimal wireless channels since the objective function in Equation 3 is non-convex and contains many local minimums.

Additionally, AI module 110 replaces the traditional integer programming optimization in real time to reduce the computational load at high density Wi-Fi networks. In addition, AI module 110 employs an advanced supervised learning method which requires a representative set of data for estimating AI parameters (training) that are used for different scenarios. An input vector and a corresponding output vector are necessary to obtain the AI parameters. The process of training AI module 110 to derive one or more optimal wireless channels for the Wi-Fi AP is further described in detail in conjunction with FIG. 3.

Further, system 100 includes a user application module 116 to transport all the functionalities of Wi-Fi APs to the cloud. User application module 116 provides an application which is downloadable on various sets of user devices and does not require any modifications to infrastructural hardware (for example, smart router installments) to make the Wi-Fi management system cost effective and web-scalable.

User application module 116 is operated in two layers namely, an application layer 118 and a cloud layer 120. Application layer 118 further includes a sense module and a set module. The sense module is used to push Wi-Fi scanning reading of some devices to the cloud and the set module configures the Wi-Fi routers using the libraries of each Wi-Fi module stored in the set module.

Cloud layer 120 analyzes backend talks with the frontend of the user's application and performs data exchanges. Cloud layer 120 also runs optimization and learning algorithms.

Further, user application module 116 is integrated to a carrier as a standalone solution or can be embedded into an existing mobile application. In the embedded deployment scenario, the set module is performed by an auto configuration server (ACS), while in the standalone scenario, standalone application utilizes the set module directly because the set module configures the user modem even in the absence of internet connection.

Figure 2:
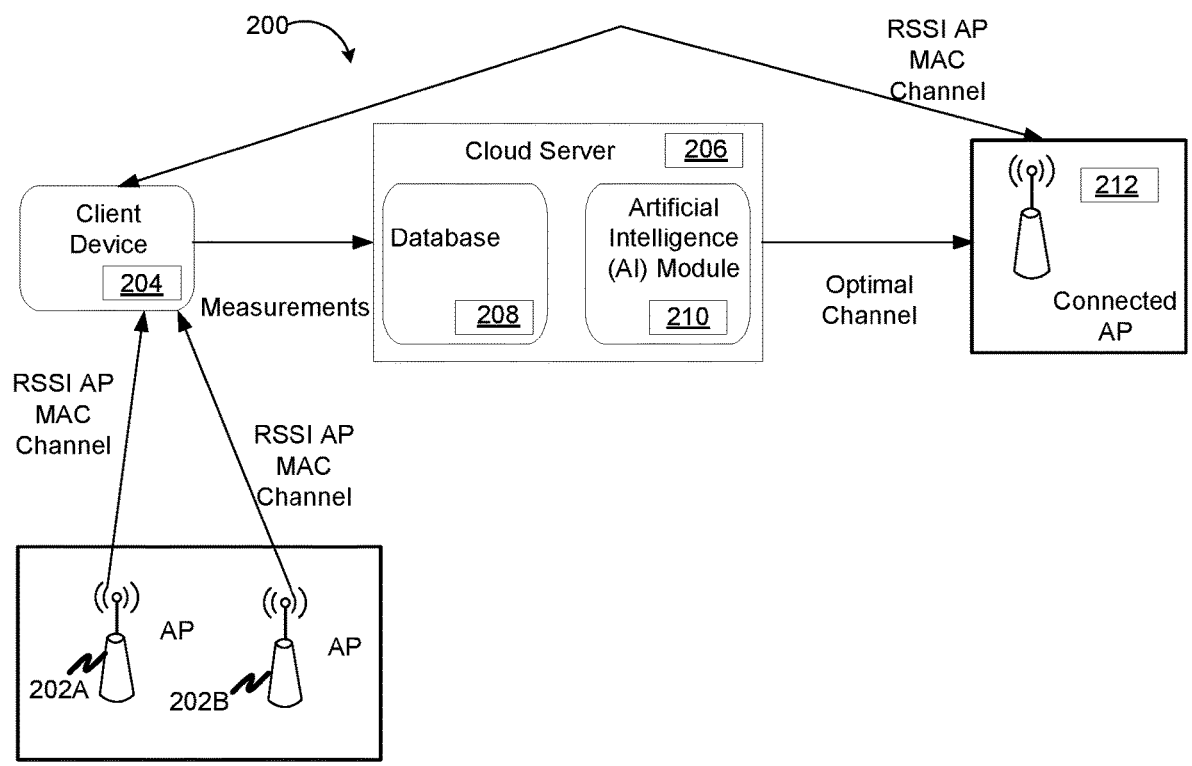
FIG. 2 illustrates a process for collecting Radio Frequency (RF) measurements from a plurality of client devices in the cloud and evaluating/processing the RF measurements to derive one or more optimal wireless channels for the Wi-Fi access point in accordance with an embodiment of the invention.

FIG. 2 illustrates a process 200 for collecting RF measurements from the plurality of client devices in the cloud and evaluating/processing the RF measurements to derive one or more optimal wireless channels to the Wi-Fi AP in accordance with an embodiment of the invention.

As illustrated in FIG. 2, the measurements in the cloud are updated once a new set of measurements are available from a particular STA to reflect the latest RF environment in the calculation of optimality in the real time.

A Wi-Fi network may be deprived of RF measurements if the connected STAs are running with a specific operating system which is difficult to upload the RF measurements. To avoid the issue, client device 204 uploads RF measurements to a cloud server 206, when the Wi-Fi network meets an AP which lacks recent measurements. Cloud server 206 includes a database 208 and an AI module 210. Database 208 stores the RF measurements, and AI module 210 calculates the optimal transmission channel for connected Wi-Fi AP 212 based on the RF measurements uploaded by client device 204.

RF measurement module 108 avoids excessive data generation using plurality of filters and statistical monitoring methods to determine the upload frequency from client device 204 and remotely change the frequency of measurement.

Further, RF measurement module 108 performs a speed test to determine the backhaul channel when signal strength is high and the transmission channel is optimum. Also, RF measurement module 108 identifies the 802.11 protocol of connected Wi-Fi AP 212 for the efficient distribution of Wi-Fi resources. Additionally, RF measurement module 108 runs in the background to report the current RF conditions and triggers the optimization when the conditions change, and do not increase the battery consumption significantly.

Figure 3:
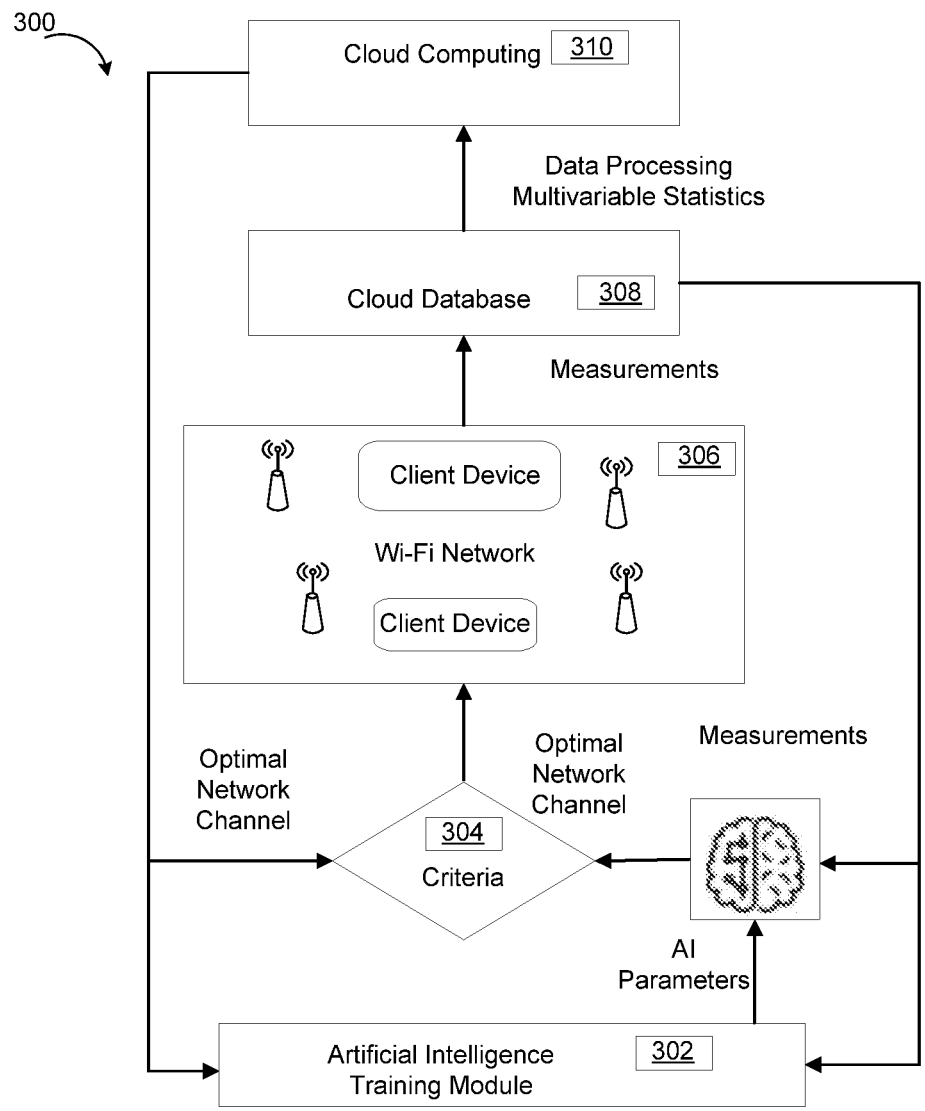
FIG. 3 illustrates a process for training an Artificial Intelligence (AI) module by utilizing the collected RF measurements and a plurality of measured variables to derive one or more optimal wireless channels for the Wi-Fi access point in accordance with an embodiment of the invention.

FIG. 3 illustrates a process 300 for training AI module 110 by utilizing the collected RF measurements and a plurality of measured variables to derive the one or more optimal wireless channels for the Wi-Fi AP in accordance with an embodiment of the invention.

As illustrated in FIG. 3, process 300 employs an AI training module 302 which utilizes the measurements of STAs and the solutions of traditional integer point optimization algorithm.

AI training module 302 obtains AI parameters by training the data set with output vector construction and input vector construction, and utilizing a decision-making criterion 304 to calculate the AI parameters for obtaining the optimal transmission channel.

In case of training the data set with output vector construction, both AI and traditional integer optimization aim maximizing the overall signal quality of a Wi-Fi network 306 to increase the Wi-Fi link speed for higher data rate.

The output vector of AI for training the data set with output vector construction is the optimal transmission channel and is calculated by an integer programming based optimization problem as represented in the equation below:

$$\text{Max}_{CH_i} SINR_i = \frac{RSSI_i}{\sum_{j=1, j \neq i}^{N} RSSI_j \cdot O(i, j) + \text{Noise}} \quad (4)$$

S.t.

$$CH_i \in CH$$

where $SINR_i$ is the SINR of a particular STA which is connected to $i^{th}$ AP, $RSSI_i$ is the RSSI from the $i^{th}$ AP, O(i, j) is the fractional bandwidth overlap between transmission channels of $i^{th}$ and $j^{th}$ APs. $O(i, j)$ is zero for non-overlapping channels only and independent of the network structure. $O(i, j)$ also includes channels from both 2.4 GHz and 5 GHz band (also in upcoming 6 GHz). $CH_i$ is the transmission channel of the $i^{th}$ AP. CH is the available set of channels for a particular country where the optimization is performed.

The solution of Equation 4 becomes computationally and theoretically challenging as the number of APs increase in Wi-Fi network 306. Usually, heuristic integer programming algorithms are incorporated to fasten the computations. The heuristic integer programming algorithms eventually deliver optimal or suboptimal transmission channels for particular APs under pre-uploaded measurements. Subsequently, AI training module 302 exploits the complex interactions between the measurements and optimal transmission channel calculation from Equation 4.

Further, a high amount of data is required to represent a wide range of Wi-Fi network conditions and thus Equation 4 is solved for each case, which is computationally costly. On the other hand, Equation 4 is a onetime process to calculate the AI parameter using decision-making criteria 304 and update when the AI performance is below a threshold.

In another case of training the data set with input vector construction, the predictions of AI are more accurate if the training set covers a whole data range with adequate number of layers and training time. The training of AI needs high amount of data from which AI parameters are calculated based on decision-making criteria 304. A typical equation for AI formulation is represented as follows:

$$y = f_1(p_1 \cdot f_2(p_2 \cdot U + p_3) + p_4) \qquad (5)$$

where $f_1$ is the output function. Usually softmax function is used to calculate the probabilities of outputs when classification is necessary as in the case of Wi-Fi AP channels. Subsequently, $f_2$ is the activation function and usually tan h or sigmoid is preferred. $p_{1-4}$ are the parameters which may include, but need not be limited to, matrices and vectors of the AI. The parameters are updated once a statistically new measurement is available, forcing AI to evolve by capturing new patterns in the data. The performance of AI improves when its parameters are estimated from a higher number and statistically significant measurements. U is the vector of the input variables which includes the measurements from the RF environment and y is the vector or probabilities of channels.

The construction of U is a challenging task since Wi-Fi network 306 has high complexity with mobility of STAs, different Wi-Fi protocols and external RF disturbances. Process 300 provides a practical U architecture (Wi-Fi network 306) that includes the impact of crucial and easily measurable network variables which include RSSIs from nearby APs and their transmission channels. Other measurable variables are included in the derivation, however current variables show satisfactory performance in the calculations.

In an implementation, Wi-Fi network 306 includes 7 APs and 6 STAs which are all connected to $AP_1$. The numbers of APs and STAs are subjected to change due to mobility of the STAs and the density of the APs. For instance, if U has 49 elements, the size of vector U is calculated using the below equation:

$$\text{dimension}(U) = (NUM_{STA} + 1) \cdot NUM_{AP} \qquad (6)$$

where $NUM_{STA}$ and $NUM_{AP}$ are the number of STAs and APs respectively.

The vector U contains the RSSIs from the connected APs and the nearby APs in addition to the transmission channels of the APs. The order of the elements are easily shuffled. Subsequently, each STA contributes with $NUM_{AP}$ elements to U and contribution from the $1^{st}$ STA (first 7 elements of vector U) is given in the matrix below:

$$[RSSI_{11} RSSI_{61} RSSI_{62} RSSI_{63} RSSI_{64} RSSI_{65} RSSI_{66}] \qquad (7)$$

where $RSSI_{11}$ is the RSSI from the connected AP ($AP_1$) to $STA_1$, and $RSSI_{61}$-$RSSI_{66}$ are the RSSIs from the $6^{th}$ AP ($AP_6$) to $STA_1$ to $STA_6$. In Wi-Fi network 306, the $AP_6$ contributes here since $STA_1$ gets highest RSSI from APs apart from the connected AP, making $AP_6$ the pivot for $STA_1$.

Subsequently, the contribution from the $STA_2$, which are the second 7 elements of U, is represented in the matrix as:

$$[RSSI_{12} RSSI_{51} RSSI_{52} RSSI_{53} RSSI_{54} RSSI_{55} RSSI_{56}] \qquad (8)$$

where $RSSI_{12}$ is the RSSI from the connected AP ($AP_1$) to $STA_2$, and $RSSI_{51}$-$RSSI_{56}$ are the RSSIs from the $5^{th}$ AP ($AP_5$) to $STA_1$ to $STA_6$. In the above matrix, $AP_5$ delivers the highest RSSI signal to $STA_2$ apart from the connected AP ($AP_1$), by looping overall STAs.

Therefore, Equation 7 and Equation 8 deliver 14 elements from 2 STAs and overall 6 STAs deliver 42 elements. The last 7 elements are calculated from a matrix of channels as represented below:

$$[CH_1 CH_6 CH_5 \ldots \ldots \ldots ] \qquad (9)$$

where $CH_1$ is the transmission channel of the connected AP, $CH_6$ is the transmission channel of the pivot AP in of STA, and $CH_5$ is the transmission channel of the pivot AP of $STA_2$.

The above procedure results in $(NUM_{STA} + 1) NUM_{AP}$ elements which represent overall Wi-Fi network 306 conditions with easily measurable and practical network variables.

Once U is available for training data, AI training module 302 mathematically takes U as input and calculates the optimum transmission channel of the connected AP ($AP_1$ in this case) using the equation below:

$$AI(U) = CH_1^o \qquad (10)$$

where $CH_1^o$ is vector of probabilities of optimum transmission channel of $AP_1$. The index with maximum probability is the optimal transmission channel of $AP_1$, $CH_1^\gamma$. In the perfect prediction case, $CH_1^\gamma$ is the value obtained from the traditional integer programming optimization.

In practice, AI training module 302 contains high number of U vectors which reflects the current transmission channels and the signal powers, and optimum transmission channel of a particular AP which is calculated through the traditional optimization algorithm. The optimization algorithm integrates over probable channels of the particular AP and calculates SINR for each transmission channel. The maximum SINR resulting transmission channel is $CH_1^o$, whereas AI delivers the result through matrix multiplications as represented in Equation 5. Thus, AI training module 302 learns the relationship between the transmission channels at different signal powers and optimum transmission channel.

Further, the parameters in Equation 4 include a well-defined dimension and needs a convenient size of input vector, which hinders the potential applications when the number of client devices and APs change from the originally trained dimensions. To deal with the issue, two sub-algorithms are defined, which may include, but need not be limited to, an algorithm with less STAs than desired, and an algorithm with more STAs than desired.

In an embodiment with less STAs than desired, each STA in Wi-Fi network 306 uploads RF measurements to a cloud database 308 for centralized computations. When the number of STAs are less than the designed AI, the measurements of a STA are duplicated under a newly defined pseudo-STA. The pseudo-STA includes the same measurements with the clone. The generation of pseudo-STAs is continued until desired number of STAs are obtained. Once the number of STAs reaches the desired value, the input vector is formulated regularly.

For a better performance, STAs with low-RSSI are considered as more convenient candidates for the duplication. Once the STAs with low-RSSI are preferred for duplication, AI assigns more weight on the STAs with low-RSSI while calculating the optimal transmission channel, which in turn adds more emphasis on gaining STAs with low data rate.

In another embodiment with more STAs than desired, the algorithm randomly selects the desired number of STAs for calculating the optimal transmission channel. A wiser choice is the selection of STAs with low-RSSI than selecting STAs with high-RSSI, since client devices with high-RSSI already have high data rates.

Further, cloud database 308 generates multivariable statistical data for STAs with low-RSSI and STAs with high-RSSI corresponding to low data rates and high data rates respectively. The multivariable statistical data is processed using the traditional integer point optimization algorithm which is calculated through cloud computing 310 for re-training the AI module.

Figure 4:
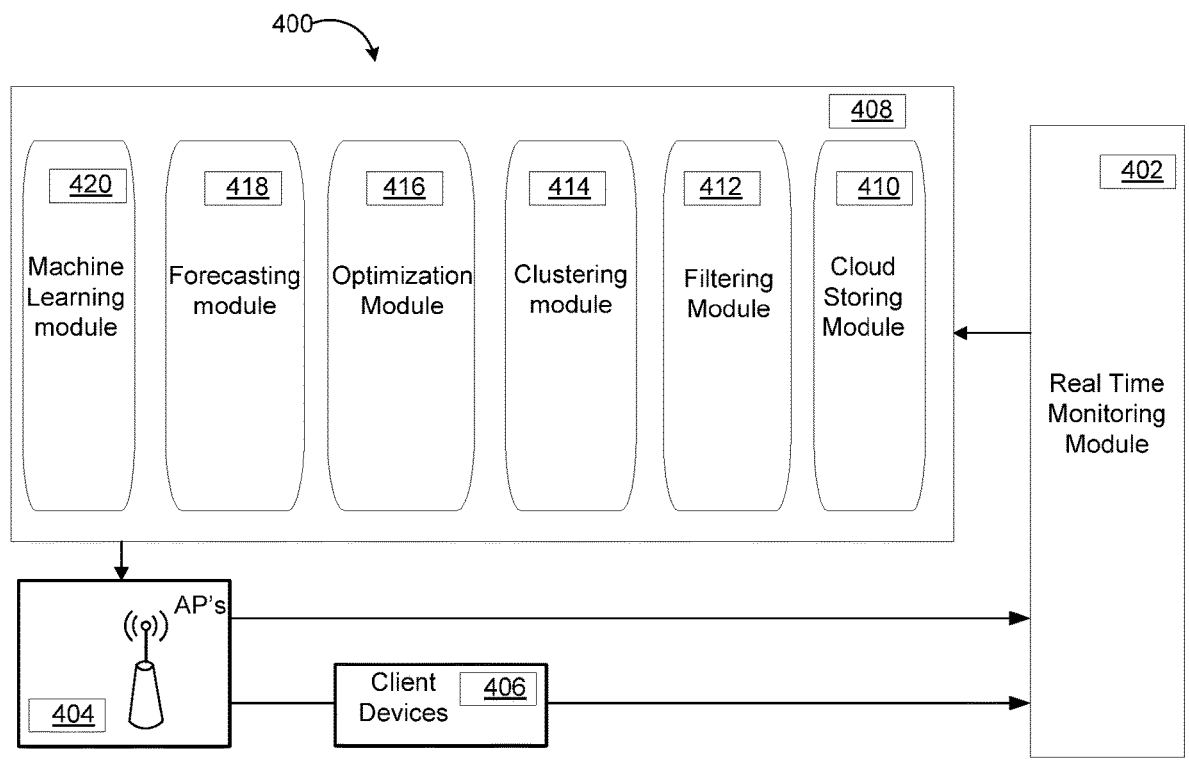
FIG. 4 illustrates a process for evaluating/processing the RF measurements in a cloud server to derive one or more optimal wireless channels for the Wi-Fi access point in accordance with an embodiment of the invention.

FIG. 4 illustrates a process 400 for evaluating/processing the RF measurements in a cloud server to derive one or more optimal wireless channels for the Wi-Fi access point in accordance with another embodiment of the invention.

As illustrated in FIG. 4, Real-Time Monitoring (RTM) module 402 collects online measurements from a plurality of Wi-Fi APs 404 and a plurality of client devices 406 through a cloud based network and transmits the online measurements to a cloud server 408 at variable and adaptable frequencies. Subsequently, the critical network measurements and adaptable AP parameters are shown in the table below:

TABLE 2

| AP settings | Network Measurements |
| --- | --- |
| RTS/CTS Threshold | AP average access delay |
| Fragmentation Threshold | Average access delay for |
| Beacon Interval | each access category |
| DTI Interval | Associated STA count |
| 802.11 Mode | Channel utilization |
| 802.11 Protection | Transmitted fragment counts |
| Transmit Power | Group addressed transmitted |
| Operating Channel Bandwidth | frame counts |
| Channels in Use | Failed counts |
| WAN Managed Upstream Bandwidth | Retry counts |
| LAN Managed Downstream Bandwidth | Multiple retry counts |
| | Frame duplicate counts |
| | RTS success counts |
| | RTS failure counts |
| | ACK failure counts |
| | Received fragment counts |
| | Group addressed received |
| | frame counts |
| | FCS error counts |
| | Transmitted frame counts |
| | RSSI on individual devices |
| | Total data transfer |

The primary monitoring variables in Table 2 may include, but need not be limited to, total data transfer, channel utilization, associated STA counts and RSSI on individual devices.

RTM module 402 adapts a data importing frequency based on a transition profile of network variables and disturbance from environmental APs, where a combination of primary variables is monitored with high frequency since it is defined as an indication of overall process variation. Further, RTM module 402 identifies a significant change in the network variable and triggers or warns the re-solution of optimization problem. If RTM module does not identify any crucial change in the network variables, then the optimal setting profiles for plurality of Wi-Fi APs 404 is not re-calculated. The various sources of re-optimization may include, but need not be limited to, changes in the data transfer rates, changes in the network management policy, and measurable and immeasurable disturbances.

Once there is a change in any of the sources, RTM module 402 raises a fault warning to initiate the re-optimization process in addition to delivery of data until a pre-determined specific time, and reducing the data transfer cycle. The frequency of the monitoring sampling is inversely proportional to time constant of network dynamics.

Further, the RF measurements collected by RTM module 402 are transmitted to cloud server 408 for evaluating/processing the online measurements to update Wi-Fi AP settings and derive the one or more optimal wireless channels to the Wi-Fi access point. Cloud server 408 includes a cloud storing module 410, a filtering module 412, a clustering module 414, an optimization module 416, a forecasting module 418, and a machine learning module 420.

Cloud storing module 410 is used to store the RF measurements of the plurality of client devices 406 in real-time based on the online measurements collected by RTM module 402. Subsequently, cloud server 408 generates one or more Wi-Fi signals that are subjected to the one or more optimal transmission channels and further generates environment noises constantly. A screenshot of current network flow indicating the trends or an average of the Wi-Fi network is created. Cloud server 408 utilizes filtering module 412 to filter outlier measurements and extract the representative pattern through smoothing.

Further, cloud server 408 utilizes the cloud based network infrastructure to decompose the network variables into correlated sub data sets and reduces the network variables to monitor or manipulate. Among a set of correlated variables, a subset of variables is selected, which has relatively lower condition number of the covariance matrix. Therefore, only independent variables are considered during the decision-making process for selecting the one or more optimal wireless channels for the Wi-Fi AP.

Moreover, the decision-making process is enhanced by clustering the data using clustering module 414 based on subsequent criteria, which may include, but need not be limited to, a location, Wi-Fi network properties, and volatility of the Wi-Fi network. In case of clustering the location data, distinct networks do not show interference and do not affect each other. In case of clustering the Wi-Fi network properties, the Wi-Fi network elements with specific properties influences the overall Wi-Fi network characteristics. Further, in case of clustering the volatility, some Wi-Fi network elements are more volatile in data transfer and topology.

The clustering of network elements is applied to data from both the plurality of Wi-Fi APs 404 and the plurality of client devices (STAs) 406. Subsequently, cloud server 408 solves the optimization problem for individual clusters to speed up the computations and provide efficient control actions. The size and structure of clusters are subject to change as new data becomes available.

Cloud server 408 utilizes optimization module 416 to perform semi-empirical optimization when density of plurality of Wi-Fi APs 404 is relatively low and minimizes the interference among plurality of Wi-Fi APs 404 by solving the equation below:

$$\text{Min}_{AP_c,AP_I} \Sigma_{1=j<i\leq N}^N I(i,j)$$

s.t.

$$h(AP_c, AP_I, y, t) = 0$$

$$g(AP_C, AP_I, y, t) \leq 0$$

$$I(i,i) \geq I_{i,low}, \; i=1, \ldots N$$

$$AP_{I,i} \in AP_{I,i,set} \; i=1, \ldots, K$$

$$AP_{C,i,low} \leq AP_{c,i} \leq AP_{c,i,high} \; i=1, \ldots, M \quad (11)$$

where $AP_c$ is the vector (dimension M) of continuous manipulated subset of AP variables (i.e. RTS/CTS threshold). $AP_{c,i,high}$ and $AP_{c,i,low}$ are high and low bounds on $i^{th}$ continuous AP variable, $AP_{C,i}$, respectively. $AP_I$ is the vector (dimension N) of integer AP variables (i.e. channel number). $AP_{I,i,set}$ is the set of discrete AP variables $AP_{I,i}$ might take. y is the vector of measurements from the network. t is the time. h is the vector of equality constraints. g is the vector of inequality constraints. f is the objective function which uses the semi-empirical model and returns the performance index. Further, interference matrix I, is calculated using the RSSI measurements of APs and their channels using equation below:

$$I(i,j) = \text{RSSI}_{APs-APs}(i,j) \times O(i,j) \quad (12)$$

where $\text{RSSI}_{APs-APs}(i,j)$ is the RSSI of $j^{th}$ AP on $i^{th}$ AP. O(i,j) is the overlapping coefficient which is calculated from the fractional bandwidth overlap between the occupied channels of $i^{th}$ AP and the occupied channels of $j^{th}$ AP. O(i, j) is zero for non-overlapping channels only and independent of the network structure. O(i,j) includes channels both from 2.4 GHz and 5 GHz band.

Further, $AP_c$ includes transmission power and RTS/CTS threshold. $AP_I$ includes the operating channel bandwidth, the channels in use and 802.11 Mode. The decision variables also depend on the standard that the corresponding AP belongs to. The branch and bound algorithms which are capable of handling Mixed Integer Nonlinear Problems (MINLP) as in Equation 11 results in evaluation of all decision variables simultaneously. In some cases, the optimal solution or satisfactory sub-optimum solution are desirable through a subset of decision variables, which reduces the computation time. The subset of decision variables is determined through the correlation analysis. For instance, when the APs are geographically distinct, the power level adjustment serves the interference minimization solely, without further adjustments in channel selection.

The AP interference minimization is operationally desired usually when the AP density is low, providing a satisfactory solution of Equation 11, despite various data demand profiles.

The formulation in Equation 11 is also applicable when external WLANs that are a source of disturbance to the system exist. Since manipulation of the networks is not possible, the optimization adjusts the accessible APs for the best performance.

Further, cloud server 408 utilizes forecast module 418 to forecast the network dynamics in real time optimally, when APs get denser. The interference minimization is a sub-optimal approach due to limited channel availability as high demands may concentrate on the overlapping bands, which result in inefficient use of available channels. Forecasting network dynamics is made for two different aspects. In the first case, where real time data transfer is more feasible, the predictions include faster transitions. On the other hand, the average data demand profile is calculated with less and periodic measurements from the network, enabling a statistical database for future predictions. The forecasting horizon is longer than the time constant of the data demand transitions.

Subsequently, the transitions in data demand is optimized by optimizing the data rate, where the minimization interface is a valuable contribution. However, the primary objective is the minimization of the interference from the data transmitting APs in the case of denser networks where non-overlapping channels are scarce. The optimization problem in Equation 11 is transformed into equation below:

$$\text{Min}_{AP_c,AP_I} \sum_{t=1}^{t_N} \sum_{i=1}^{N} \sum_{j=1}^{STA_i} (DR(i,j,t) - D(i,j,t))^2 \quad (13)$$

s.t.

$$h(AP_c, AP_I, y, t) = 0$$

$$g(AP_C, AP_I, y, t) \leq 0$$

$$DR(i, j, t) \geq D(i, j, t)$$

$$AP_{I,i} \in AP_{I,i,set}, i = 1, \ldots, K$$

$$AP_{C,i,low} \leq AP_{c,i} \leq AP_{c,i,high} \; i = 1, \ldots, M$$

where $STA_i$ is the number of STAs connected to $i^{th}$ AP. DR(i,j) is the data rate enable from $i^{th}$ AP to $j^{th}$ STA. D(i,j) is the data demand, which includes uncertainty considerations of $j^{th}$ STA from $i^{th}$ AP. The objective function in Equation 12 takes the consumption of resources into account by minimizing the difference between data rate and demand instead of maximizing the data rate itself. The data rate optimization process serves the efficient use of resources in addition to satisfying the network needs.

The calculation of DR (i,j) requires data on the interactions of network elements. The calculation of data rate is handled by RSSI matrix to calculate the SINR ratio that determines the modulation based on the type of AP. For instance, the RSSI matrix in Equation 11 is further extended to include STAs as equation below:

$$RSSI = \begin{bmatrix} RSSI_{APs-APs} & RSSI_{APs-STAs} \\ RSSI_{STAs-APs} & RSSI_{STAs-STAs} \end{bmatrix} \quad (14)$$

where $RSSI_{APs-APs}$ is the RSSI matrix between APs, which is also used in Equation 12. The primary contribution in Equation 14 is the $RSSI_{STAs-APs}$ matrix which determines the extent of interference from other APs on a STA. In practice, $RSSI_{STAs-APs}$ is one of the primary limits in data rate and the corresponding impact is calculated through Equation 14. $RSSI_{STAs-STAs}$ is the interaction between STAs, which is helpful at instances while uploading data as well as at instances of hidden node issues.

Further, Equation 13 considers the dynamic horizon which utilizes future data demand forecasts. Once the demand forecast is available, a reliable and adaptive horizon of objective minimization is implemented on the Equation 13. In addition to current network conditions, future dynamics of the network is also included, enabling the probability of successful transmission attempts in the overall horizon and reducing the frequency of the control actions. The frequency of control actions is adaptive, the frequency of control actions being a function of network dynamics and cloud computation limitations.

The objective function in Equation 12 serves efficient use of channels and energy. The energy consumption is also reduced by supplying minimum amount of energy that delivers the desired data rate in discrete signal to noise ratio data rate relationship due to modulation structure for corresponding AP type.

Further, machine learning module 420 is used for pattern recognition of network elements, where the network elements are used to cluster and forecast the elements for optimization formulations. Machine learning module 420 evolves as the network data becomes available.

Cloud database includes a significant amount of historical insight on the relationship of APs, STAs and network parameters. Once predictions from machine learning module 420 become realistic, the machine learning module 420 is used to calculate the optimum setting profile, serving as an alternative to semi-empirical model in Equation 12.

Machine learning module 420 limits the extrapolation capability considerations. On the other hand, machine learning module 420 includes the primary decision variables in the network which satisfactorily deliver significant transitions in the process.

Also, machine learning optimization block solves a similar problem to Equation 12. The primary advantage of the machine learning optimization block is to capture capability of un-modeled impacts in the semi-empirical formulation.

The semi-empirical model and machine learning module 420 can easily be updated when predictions show poor performance. However, when either the semi-empirical model or machine learning module 420 show a more reliable behavior, predictions of the machine learning optimization block are weighted more.

Further, the machine learning optimization results are always immune to uncertainties and disturbances. In addition, adjustment of APs includes a cost such as sudden connection lost due to channel switch. The machine learning optimization block ensures that the expected contribution to the network is beyond uncertainties and a predefined contribution ratio.

Figure 5:
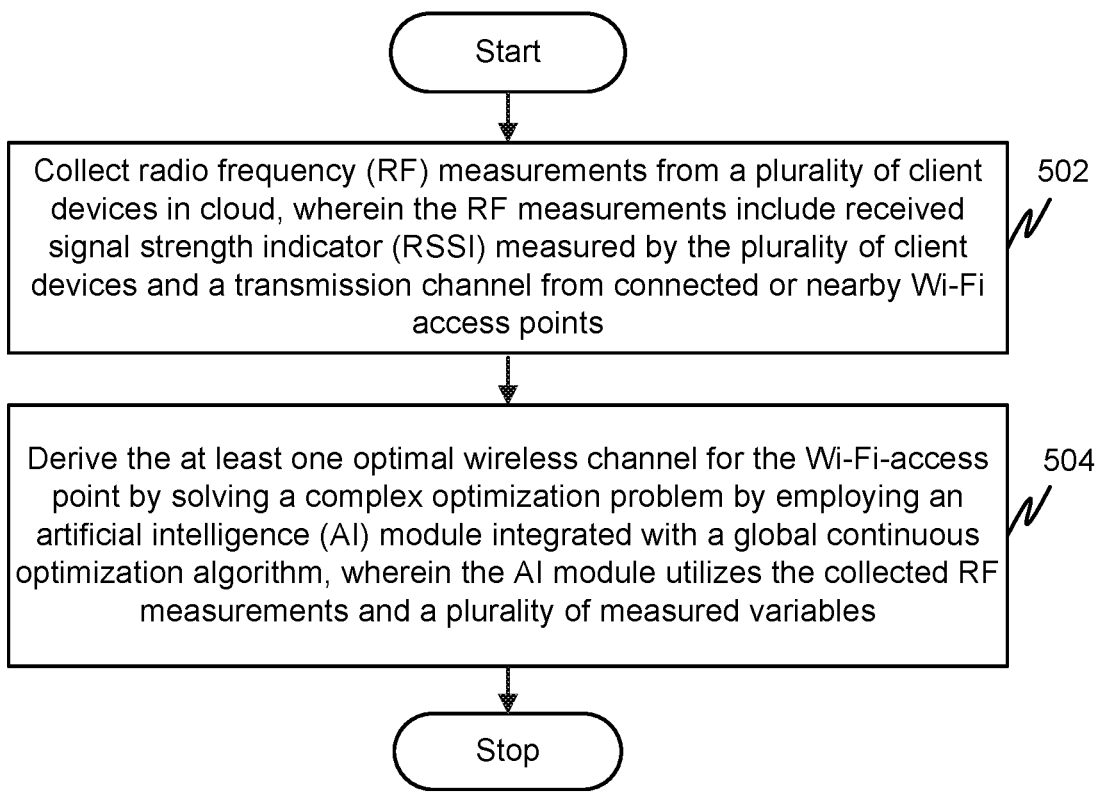
FIG. 5 illustrates a flow chart of a method for assigning one or more optimal wireless channels to a Wi-Fi access point of a plurality of Wi-Fi access points using a cloud-based software defined network (SDN) in accordance with an embodiment of the invention.

FIG. 5 illustrates a flow chart of a method for assigning one or more optimal wireless channels to a Wi-Fi AP of a plurality of Wi-Fi APs using a cloud-based SDN in accordance with an embodiment of the invention.

At step 502, RF measurements from a plurality of client devices located in the cloud are collected using RF measurement module 108. The RF measurements may include, but need not be limited to, RSSI measured by the plurality of client devices and a transmission channel from connected or nearby Wi-Fi APs.

At step 504, one or more optimal wireless channels for the Wi-Fi AP are derived by solving a complex optimization problem by employing AI module 110 integrated with global continuous optimization algorithm 114. Global continuous optimization algorithm can be, but need not be limited to, a genetic algorithm and a simulated annealing algorithm.

AI module 110 utilizes the collected RF measurements and a plurality of measured variables for determining the one or more optimal wireless channels for the Wi-Fi AP using the optimization formulation. The plurality of measured variables may include, but need not be limited to, RSSI at the Wi-Fi AP, RSSI at a client device of the plurality of client devices, a number of Wi-Fi APs whose signals reach the client device, and a number of Wi-Fi APs whose signals reach the Wi-Fi AP.

The invention provides a mobile application which is downloadable on various sets of devices that constantly scan RF measurements to report portable Wi-Fi APs for connections. Based on the RF measurement collected from the plurality of client devices, the data is uploaded to the cloud for obtaining an enhanced channel assignment performance over heuristic integer programming optimizations.

The invention utilizes a channel assignment algorithm which deals with large sub-matrices such as the equation provided below:

$$RSSI = \begin{bmatrix} RSSI_{AP\text{-}AP} & RSSI_{AP\text{-}STA} \\ RSSI_{STA\text{-}AP} & RSSI_{STA\text{-}STA} \end{bmatrix} \quad (15)$$

Thus, the channel assignment algorithm is integrated with other complex and advanced algorithms which consider easy-measurable properties for decision making. The complexity also increases when additional considerations are included in the optimization (that is, historical measurements from high number of STAs).

Further, the invention utilizes both $RSSI_{AP\text{-}AP}$ and $RSSI_{STA\text{-}AP}$ in the objective function explicitly, but can easily be extended to other sub-matrices in Equation 15.

Moreover, the primary advantage of AI applications in the channel assignment problem is the computational speed over traditional optimization methods which is analyzed deeply with the development of many heuristic optimization algorithms.

The invention also provides a centralized decision-making in the cloud, which provides more effective optimization in high-density Wi-Fi environments. The invention also considers the real-time requirements for all Wi-Fi APs in each cluster, thereby optimizing channel allocation in the cluster. This offers higher efficiency yields in comparison to the widely used decentralized approach with each Wi-Fi AP to make its own decision about selecting a best frequency.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which can implement the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for assigning at least one optimal wireless channel to a Wi-Fi access point of a plurality of Wi-Fi access points using a cloud-based software defined network (SDN), the method comprising:
   collecting, by one or more processors, radio frequency (RF) measurements from a plurality of client devices in a cloud computing network, wherein the RF measurements include a received signal strength indicator (RSSI) measured by the plurality of client devices and a transmission channel from connected or nearby Wi-Fi access points;
   deriving, by one or more processors, the at least one optimal wireless channel for the Wi-Fi-access point by solving an optimization formulation by employing an artificial intelligence (AI) module integrated with a global continuous optimization algorithm, wherein the AI module utilizes the collected RF measurements and a plurality of measured variables;
   wherein the AI module uses a machine learning algorithm to evaluate the optimization formulation in combinations of wireless channels to provide relaxation of discrete wireless channels considering an interference coefficient, wherein each interference coefficient comprises an extent of interference from a Wi-Fi access point transmitting on a respective channel; and
   training, by one or more processors, the AI module based on interference coefficient values to relate the channels of the Wi-Fi access points to a corresponding coefficient for different combinations of the Wi-Fi access points.

2. The method according to claim 1, wherein the global continuous optimization algorithm is at least one of a genetic algorithm and a simulated annealing algorithm.

3. The method according to claim 1, wherein the plurality of measured variables include one of RSSI at the Wi-Fi access point, RSSI at a client device of the plurality of client devices, a number of Wi-Fi access points whose signals reach the client device, and a number of Wi-Fi access points whose signals reach the Wi-Fi access point.

4. The method according to claim 1, wherein a rectified linear unit (ReLU) activation function in the machine learning algorithm provides an approximation of actual values in addition to providing a smooth function for the global continuous optimization algorithm.

5. The method according to claim 4 further comprising comprises, transforming, by one or more processors, the optimization formulation to change the at least one optimal wireless channel based on measurements, wherein the optimization formulation includes the trained AI module, wherein an AI function of the AI module can delivers the interference coefficient for decimal channels.

6. A system for assigning at least one optimal wireless channel to a Wi-Fi access point of a plurality of Wi-Fi access points using a cloud-based software defined network (SDN), the system comprising:
   a memory;
   a processor communicatively coupled to the memory, wherein the processor is configured to:
   collect radio frequency (RF) measurements from a plurality of client devices in cloud, wherein the RF measurements include a received signal strength indicator (RSSI) measured by the plurality of client devices and a transmission channel from connected or nearby Wi-Fi access points;
   derive the at least one optimal wireless channel for the Wi-Fi-access point by solving an optimization formulation by employing an artificial intelligence (AI) module integrated with a global continuous optimization algorithm, wherein the AI module utilizes the collected RF measurements and a plurality of measured variables;
   wherein the AI module uses a machine learning algorithm to evaluate the optimization formulation in combinations of wireless channels to provide relaxation of discrete wireless channels considering an interference coefficient, wherein each interference coefficient comprises an extent of interference from a Wi-Fi access point transmitting on a respective channel; and
   wherein the processor is configured to train the AI module based on interference coefficient values to relate the channels of the Wi-Fi access points to a corresponding coefficient for different combinations of the Wi-Fi access points.

7. The system according to claim 6, wherein the global continuous optimization algorithm comprises a genetic algorithm or a simulated annealing algorithm.

8. The system according to claim 6, wherein the plurality of measured variables include one of the RSSI at the Wi-Fi access point, the RSSI at a client device of the plurality of client devices, a number of Wi-Fi access points with signals reaching the client device, and a number of Wi-Fi access points with signals reaching the Wi-Fi access point.

9. The system according to claim 6, wherein a rectified linear unit (ReLU) activation function in the machine learning algorithm provides an approximation of actual values in addition to providing a smooth function for the global continuous optimization algorithm.

10. The system according to claim 9, wherein the processor is further configured to transform the optimization formulation, to change the at least one optimal wireless channel based on measurements, wherein the optimization formulation includes the trained AI module, wherein an AI function of the AI module delivers the interference coefficient for decimal channels.

11. A method for assigning at least one optimal wireless channel to a Wi-Fi access point of a plurality of Wi-Fi access points using a cloud-based software defined network (SDN), the method comprising:
   collecting, by one or more processors, radio frequency (RF) measurements from a plurality of client devices in a cloud computing network, wherein the RF measurements include a received signal strength indicator (RSSI) measured by the plurality of client devices and a transmission channel from connected or nearby Wi-Fi access points;
   deriving, by one or more processors, the at least one optimal wireless channel for the Wi-Fi-access point by solving an optimization formulation by employing an artificial intelligence (AI) module integrated with a global continuous optimization algorithm, wherein the AI module utilizes the collected RF measurements and a plurality of measured variables;
   wherein the AI module uses a machine learning algorithm to evaluate the optimization formulation in combinations of wireless channels to provide relaxation of discrete wireless channels considering an interference coefficient, wherein each interference coefficient comprises an extent of interference from a Wi-Fi access point transmitting on a respective channel; and wherein a rectified linear unit (ReLU) activation function in the machine learning algorithm provides an approximation of actual values in addition to providing a smooth function for the global continuous optimization algorithm.

12. The method according to claim 11, wherein the global continuous optimization algorithm comprises a genetic algorithm or a simulated annealing algorithm.

13. The method according to claim 11, wherein the plurality of measured variables include one of the RSSI at the Wi-Fi access point, the RSSI at a client device of the plurality of client devices, a number of Wi-Fi access points with respective signals reaching the client device, and a number of Wi-Fi access points with signals reaching the Wi-Fi access point.

14. The method of claim 11, further comprising training, by one or more processors, the AI module based on interference coefficient values to relate the channels of the Wi-Fi access points to a corresponding coefficient for different combinations of Wi-Fi access points.

15. The method according to claim 14, further comprising transforming, by one or more processors, the optimization formulation to change the at least one optimal wireless channel based on measurements, wherein the optimization formulation includes the trained AI module, wherein an AI function of the AI module delivers the interference coefficient for decimal channels.

* * * * *